United States Patent
Hu et al.

(10) Patent No.: US 6,486,229 B1
(45) Date of Patent: Nov. 26, 2002

(54) RADIATION CURABLE HOT MELT ADHESIVE

(75) Inventors: Ziyi Hu, Somerville, NJ (US); Charles W. Paul, Madison, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/517,412

(22) Filed: Mar. 2, 2000

(51) Int. Cl.⁷ .................................................. C08J 3/28
(52) U.S. Cl. ........................... 522/80; 522/149; 525/90; 525/314
(58) Field of Search ...................... 522/80, 149; 525/90, 525/314

(56) References Cited

U.S. PATENT DOCUMENTS

| | | | |
|---|---|---|---|
| 3,239,478 A | 3/1966 | Harlan et al. | 260/27 |
| 3,247,269 A | 4/1966 | Storrs et al. | 260/666 |
| 3,700,633 A | 10/1972 | Wald et al. | 260/880 |
| 3,753,936 A | 8/1973 | Marrs et al. | 260/27 |
| 3,932,327 A | 1/1976 | Naylor | 260/27 |
| 3,937,760 A | 2/1976 | Cole et al. | 260/880 |
| 5,300,582 A | 4/1994 | Debier et al. | 525/314 |
| 5,777,039 A * | 7/1998 | De Craene et al. | 525/314 |

* cited by examiner

Primary Examiner—David W. Wu
Assistant Examiner—R. Harlan
(74) Attorney, Agent, or Firm—Cynthia L. Foulke

(57) ABSTRACT

Provides high vinyl, radial multi-block styrene-butadiene-styrene-containing hot melt adhesive compositions that are radiation-curable to yield pressure-sensitive adhesive films with improved peel adhesion and cohesive strength, especially at elevated temperatures. These pressure-sensitive adhesive tapes are ideally suited for tape and label applications requiring good cohesive strength at elevated temperatures and yet are readily removed from painted or other surfaces leaving no adhesive residue.

13 Claims, No Drawings

RADIATION CURABLE HOT MELT ADHESIVE

BACKGROUND OF THE INVENTION

Hot melt pressure sensitive adhesives are very popular for use in tapes and labels primarily because the inherent tackiness at room temperature allows them to adhere to substrates even after they have cooled from their molten state. Labels and tapes may be coated with hot melt pressure sensitive adhesives and laminated with release liner allowing end users to adhere or seal them at a later time.

Multi-block copolymers known for use in hot melt pressure-sensitive adhesive formulations include, for example, poly(styrene-isoprene-styrene) and poly(styrene-butadiene-styrene). These multi-block copolymers are usually formulated with tackifiers and oils to form hot melt pressure-sensitive adhesives.

The use of block copolymers in adhesive applications has grown in recent years. Their advantage over homopolymers or random copolymers such as natural rubber and styrene-butadiene rubber relates to their shear and high temperature performance. This derives from the persistence of polystyrene phase structure in the tackified adhesive formulations. These high glass transition temperature (Tg) domains function as physical cross-links, or fillers, which enhance modulus at high temperature and/or creep resistance over long periods of time.

The use of high vinyl styrene-butadiene-styrene polymers in radiation curable adhesives is known and described in U.S. Pat. No. 5,777,039 (De Crane et al) and U.S. Pat. No. 5,300,582 (Debier et al).

U.S. Pat. No. 5,777,039 describes block copolymers for use in hot melt adhesive compositions. These block copolymers comprise poly(vinylaromatic) and poly(butadiene) blocks and have a vinyl content in the range of 25 to 75% by weight.

U.S. Pat. No. 5,300,582 describes block copolymers for user in radiation curable adhesive compositions. These comprise a block of polymerized styrene and a block of polybutadiene having a vinyl content in the range 35 to 70% by weight.

Despite the prior art relating to adhesive compositions containing radiation curable block copolymers, it would be an advantage to provide block copolymers which demonstrate improved UV or EB radiation sensitivity in hot melt compositions whilst showing a superior balance of peel and tack over the known compositions.

This invention relates to superior adhesive compositions comprising styrenic multi-block copolymers having good heat resistance properties. These compositions may be used in pressure sensitive tape and label applications.

SUMMARY OF THE INVENTION

Accordingly, one object of the present invention is to provide an adhesive composition suitable as a radiation-curable hot melt adhesive or radiation-curable hot melt pressure-sensitive adhesive, which composition has excellent flexibility at low temperature, good compatibility with a variety of the additives used in various hot melt adhesive compositions, a comparatively low melt viscosity to permit easy coating work at low temperature, small change of the melt viscosity at different temperatures, excellent process stability, and excellent adhesion, peel, tack and cohesion.

Briefly, this object and other objects of the present invention as hereinafter will become more readily apparent can be attained by the use of at least one block copolymer comprising a high vinyl radial multi-block styrene-butadiene-styrene copolymer.

The present invention provides high vinyl, radial multi-block styrene-butadiene-styrene-containing hot melt adhesive compositions that are radiation-curable to yield pressure-sensitive adhesive films with improved peel adhesion and cohesive strength, especially at elevated temperatures. The pressure-sensitive adhesive tapes of the invention are ideally suited for tape and label applications requiring good cohesive strength at elevated temperatures and yet are readily removed from painted or other surfaces leaving no adhesive residue.

The present invention provides a radiation-curable hot-melt adhesive composition which comprises:

(a) from about 5% to about 40% by weight of at least one high vinyl, radial multi-block styrene-butadiene copolymer;

(b) from about 30% to about 80% by weight of at least one solid tackifier;

(c) from about 0.05% to about 5% by weight of at least one photoinitiator;

(d) from about 0% to about 15% by weight of at least one high vinyl, linear styrene-butadiene-styrene or multi-block styrene-butadiene copolymer;

(e) from about 0% to about 15% by weight of at least one high diblock conventional low vinyl styrene-butadiene-styrene or styrene-isoprene-styrene block copolymer;

(f) from about 0% to about 40% by weight of at least one oil or liquid tackifier; and (g) from about 0% to about 3% by weight of at least one antioxidant.

DETAILED DESCRIPTION OF THE INVENTION

The term "adhesive" or "adhesive composition", as used hereinafter means an adhesive or adhesive composition including a pressure-sensitive adhesive or a pressure-sensitive adhesive composition, respectively.

The term "hot melt adhesive" or "hot melt adhesive composition", as used hereinafter, means an adhesive or adhesive composition which is used for adhesion which is effected by melting an adhesive or adhesive composition by heating, applying it to an adherend in a molten state and then solidifying it at low temperature. The term "pressure-sensitive adhesive" or "pressure-sensitive adhesive composition", as used hereinafter, means an adhesive or adhesive composition which carries out pressure sensitive adhesion with tack. The term "hot melt pressure-sensitive adhesive" or "hot melt pressure-sensitive adhesive composition" as used hereinafter means an adhesive or adhesive composition which, upon production of adhesive goods such as adhesive tapes and adhesive sheets by applying an adhesive or adhesive composition to a base material such as paper, cloth or plastic film, is capable of forming a layer of the pressure-sensitive adhesive or pressure-sensitive adhesive composition on the base material by applying it to the base material as a hot-melt.

The term "high vinyl" as used herein is intended to mean having a vinyl content of 20% or higher, preferably 40% to 70%.

The term "high diblock" as used herein is intended to mean having a diblock content of 30% or higher, preferably greater than 50%.

The term "tackifier" as used herein means any composition which is useful to impart tack to the hot melt adhesive composition. ASTM D-1878-1T defines tack as "the property of a material which enables it to form a bond of measurable strength immediately on contact with another surface".

The term "radiation-curable adhesive" as used herein means an adhesive composition which is curable upon exposure to actinic and/or ionizing radiation. The term "curable" is used herein in its conventional sense as meaning capable of forming covalent cross-links.

The term "radiation" is used herein to include actinic radiation such as ultraviolet radiation and ionizing radiation created by the emission of electrons or highly accelerated nuclear particles such as neutrons, alpha-particles etc.

The radiation curable adhesive compositions of the present invention are particularly useful for hot melt pressure sensitive adhesive applications such as tapes, labels, and a wide variety of self-adhesive products. The inventive compositions are particularly useful for more demanding pressure sensitive adhesive applications requiring high heat resistance and/or plasticizer resistance and/or chemical resistance such as printer labels, tapes and labels for under the hood of automobiles and medical tapes, devices and bandages which are adhered to skin. The uncured composition is applied to a substrate such as films including polyvinyl chloride, polyester, polyolefins, polymeric foams, foil or paper and then cured by exposure to a radiant energy source.

Multi-block copolymers have greater structural heterogeneity and a broader molecular weight distribution compared to the materials as described in U.S. Pat. No. 5,300,582 (Debier et al) such as KX-222C as used in the comparative examples herein. It is believed this heterogeneity provides the improved properties observed with the inventive compositions.

Preferred uses of the present formulation are in the preparation of pressure-sensitive adhesive tapes and in the manufacture of labels. The pressure-sensitive adhesive tape comprises a flexible backing sheet and a layer of the adhesive composition of the instant invention coated on one major surface of the backing sheet. The backing sheet may be a plastic film, paper, or any other suitable material and the tape may include various other layers or coatings, such as primers, release coatings, and the like, which are used in the manufacture of pressure-sensitive adhesive tapes.

The present invention provides a radiation-curable hot-melt adhesive composition which comprises:

(a) from about 5% to about 40% by weight of at least one high vinyl, radial multi-block styrene-butadiene copolymer;

(b) from about 30% to about 80% by weight of at least one solid tackifier;

(c) from about 0.05% to about 5% by weight of at least one photoinitiator;

(d) from about 0% to about 15% by weight of at least one high vinyl, linear styrene-butadiene-styrene or multi-block styrene-butadiene copolymer;

(e) from about 0% to about 15% by weight of at least one high diblock conventional low vinyl styrene-butadiene-styrene or styrene-isoprene-styrene block copolymer;

(f) from about 0% to about 40% by weight of at least one oil or at least one liquid tackifier; and (g) from about 0% to about 3% by weight of at least one antioxidant.

Suitable high vinyl, radial multi-block styrene-butadiene block copolymers include, but are not limited to, four arm radial multi-block styrene-butadiene copolymers comprising 60% vinyl, 26% styrene and a relatively broad molecular weight distribution (Mn=94,200 and Mw=276,100). Such block copolymers include SR8296 available from Firestone.

Suitable high vinyl linear styrene-butadiene multi-block copolymers include, but are not limited to, linear multi-block styrene-butadiene copolymers having 57% vinyl, 44% styrene, melt index=13 (cond. G), (Mw=85,000 and Mn=54,000). Such copolymers include STEREON 857 available from Firestone.

Suitable high diblock conventional low vinyl styrene-butadiene-styrene, or SIS, block copolymers include Asaprene JT38; Kraton D1119; Quintac SL117; SR8219.

Multi-block copolymers may be prepared by a variety of methods. One such method is described in U.S. Pat. No. 3,937,760 (The Firestone Tire & Rubber Company). A typical multi-block copolymer is SR8296. This is a four arm radial multi-block styrene-butadiene copolymer comprising 60% vinyl, 26% styrene and a relatively broad molecular weight distribution (Mn=94,200 and Mw=276,100) and is available from Firestone.

Radial polymers provide lower viscosity for a given molecular weight (see J. M. Tancrede and C. F. Diehl, Adhesives Age, 11/96, p. 36).

Solid hydrogenated tackifying resins are useful in the radiation curable composition of the invention in concentrations ranging from about 30% by weight to about 80% by weight, preferably in amounts ranging from about 45% by weight to about 70%, more preferably from about 50% by weight to about 65% by weight.

Representative tackifying resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Also included are the cyclic or acyclic $C_5$ resins and aromatic modified acyclic or cyclic resins. Preferred are hydrogenated, cyclic or $C_5$ resins, such as Escorez 5400 (Exxon), hydrogenated aromatic modified cyclic resin ECR179EX (Exxon). Mixtures of two or more of the above described tackifying resins may be required for some formulations.

The photoinitiators are typically employed in concentrations ranging from about 0.05% by weight to about 5% by weight, preferably in amounts ranging from about 0.2% by weight to about 3% by weight, more preferably from about 0.5% by weight to about 1.5% by weight. The concentration is chosen based on the thickness of the application of the uncured radiation curable composition. Commercial examples include Irgacure 651, 184 and 1700 and Darocur 1173, available from Ciba-Geigy as well as Genocure LBP available from Rahn, and Esacure KIP150 available from Sartomer.

Other examples of photoinitiators which may be used include one or more of the following:

Benzophenone
Benzyldimethyl ketal
Isopropylthioxanthone
bis(2,6-dimethoxybenzoyl)(2,4,4-trimethylpentyl) phosphineoxide
2-hydroxy-2-methyl-1-phenyl-1-propanone
Diphenyl(2,4,6-trimethybenzoyl)phosphine oxides
1-hydroxycyclohexyl phenyl ketone
2-benzyl-2-(dimethylamino)-1-)4-(4-morpholinyl) phenyl-1-butanone
alpha.,.alpha.-dimethoxy-.alpha.-phenylacetophenone
2,2-diethoxyacetophenone
2-methyl-1-)4-(methylthio)phenyl-2-(4-morpholinyl)-1-propanone
2-hydroxy-1-4-(hydroxyethoxy)phenyl-2-methyl-1-propanone Combinations of photoinitiators may be used to achieve the best possible cure of adhesive compositions. Photoinitiators are preferably used in the least amount necessary to get initiation of cure at the line speed of the process. The cure process is generally more efficient in the absence of oxygen, for example, in the presence of nitrogen, so a greater amount of photoinitiator is generally required in the presence of oxygen.

The hot melt adhesive of the present invention may also comprise about 0% by weight to about 40% by weight of an oil diluent. Suitable plasticizing or extending oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Preferred are LUMINOL T350, a mineral oil available from Petrocanada and KAYDOL OIL available from Witco Corporation.

Antioxidants are typically added to the commercially available compounds in order to protect the ingredients against degradation during preparation and use of the adhesive compositions, however without interfering with the irradiation curing of the polymer. Combinations of antioxidants are often more effective due to the different mechanisms of degradation to which various polymers are subject. Certain hindered phenols, organo-metallic compounds, aromatic amines, aromatic phosphites, and sulphur compounds are useful for this purpose. Examples of effective types of these materials include phenolic antioxidants, thio compounds, and tris(nonylated phenyl) phosphites.

Examples of commercially available antioxidants are:

IRGANOX 1010—(pentaetythrityl-tetrakis[3-(3,5-di-tertbutyl-4-hydroxyphenyl)propionate;

IONOL—2,6-di-tertiary-butyl-4-methyl phenol;
IONOX330—3,4,6-tris (3,5-di-tertiary-butyl-phydroxybenzyl)-1,3,5-trimethylbenzene;
POLYGARD HR—tris-(2,4-di-tertiary-butyl-phenyl) phosphite.

To ensure long-term thermal stability, in general from about 0.1% to about 3% by weight of one or more antioxidants is included in the adhesive compositions, preferably from about 0.4% by weight to about 1.5% by weight.

Additional materials may be added optionally to the adhesive composition at up to about 15% by weight, preferably from about 5% by weight to about 10% by weight, dependent on the intended end-use of the adhesive. Such additional materials include, without limitation, block copolymers of monovinyl aromatic hydrocarbons and conjugated dienes such as polystyrene-polybutadiene-polystyrene, polystyrene-polyisoprene-polystyrene, poly(alpha-methyl-styrene)-polybutadiene-poly(alpha-methylstyrene), poly(alpha-methyl-styrene)-polyisoprene-poly(alpha-methylstyrene), as well as the hydrogenated modifications thereof, e.g. polystyrenepoly(ethylene-butylene)-polystyrene and polystyrene-poly(ethylenepropylene)-polystyrene. These copolymers may be prepared by methods taught, for example, in U.S. Pat. Nos. 3,239,478; 3,247,269; 3,700,633; 3,753,936; and 3,932,327, and are available from several manufacturers, including Shell Chemical Co. under the trade name KRATON.

Other, non-limiting examples of additional materials include the following:

SBR random copolymers with low (<20%) or high (>20%) vinyl contents, available under the tradename DURADENE from Firestone (these high vinyl copolymers are reactive and contribute to the crosslinking of the system);

EPDM copolymers which can react into the polymer network via unsaturated sites, and saturated analogs (e.g. EP rubber) that can modify the peel and tack of the adhesive. These are available from Exxon under the trade name VISTALON;

Butyl rubber, which is a copolymer of isoprene and isobutylene and is available from Exxon Chemical Company under the trade name SB BUTYL;

Polyisobutylene, available from Exxon Chemical Company under the trade name VISTANEX; and Liquid polyisopropylene such as is available from Kuraray Inc. under the trade name LIR.

In addition to the above-described additional materials, the various compositions of the present invention may include other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those which do not have appreciable absorption in the wavelengths of interest.

Examples of pigments and filler materials include, but are not limited to, titanium dioxide, hydrophobic amorphous fumed silica, amorphous precipitated silica, carbon black, and polymer powders. Examples of flow and leveling additives, wetting agents, and antifoaming agents include silicones, hydrocarbons, fluorine-containing compounds, and non-silicone polymers and copolymers such as copolyacrylates.

Other materials which may be added optionally to the adhesive composition include endblock resins which are substantially aromatic. Examples of such endblock resins can be prepared from any substantially aromatic monomers having a polymerizable unsaturated group. Typical examples of such aromatic monomers include the styrenic monomers, styrene, alpha-methyl styrene, vinyl toluene, methoxy styrene, tertiary butyl styrene, chloro styrene, etc., indene monomers including indene, and methyl indene. The aromatic endblock resin is preferably present in amounts of 5 to 20 weight percent. Preferred is HERCOLITE 240 or KRISTALEX 5140, both of which are alpha methyl styrene resins available from Hercules, Inc.

In a preferred embodiment of the present invention the adhesive composition comprises:

(a) about 20% to about 30% by weight radial multi-block styrenebutadiene block copolymer having about 60% by weight vinyl and about 26% by weight styrene;

(b) about 45% to about 60% by weight of a hydrogenated tackifier resin;

(c) about 0.5% to about 1.5% by weight of a photoinitiator;

(d) about 10% to about 20% by weight of a white mineral oil;

(e) about 0% to about 0.5% by weight of an acrylic antioxidant;

(f) about 0% to about 0.5% by weight of a thioester antioxidant; and (g) about 0% to about 0.5% by weight of a hindered phenol antioxidant; and (h) about 0% to about 10% by weight of a diblock copolymer.

The following composition is an example of an adhesive according to the present invention:

(a) about 24% by weight radial multi-block styrene-butadiene copolymer having about 60% by weight vinyl and about 26% by weight styrene;

(b) about 49.5% by weight of a DCPD tackifier resin;

(c) about 0.8% by weight of a photoinitiator;

(d) about 18% by weight of a white mineral oil;

(e) about 0.3% by weight of an acrylic antioxidant;

(f) about 0.3% by weight of a thioester antioxidant;

(g) about 0.2% by weight of a hindered phenol antioxidant; and (h) about 6% by weight of an SB diblock copolymer.

The adhesive compositions of the invention are prepared by conventional methods. As an example, the block copolymers, the tackifying resin and other desired components may be blended at an elevated temperature, (e.g. temperature of about 300° F.) using an extruder, a Z-blade mixer or other conventional mixing device. A preferred method employs the process as disclosed in U.S. Pat. No. 3,937,760, the disclosure of which is incorporated herein by reference.

The resultant adhesives provide a superior balance of peel and tack and are particularly useful as radiation curable adhesives in the preparation of pressure-sensitive tapes or in the manufacture of labels.

EXAMPLES

Test Methods

1. Shear Test

The adhesive was cast as a 2 mil film on a 1.5 mil PET backing film. This was then cut into strips, each having a 1 square inch. bonded area and bonded to a polished stainless steel plate. Shear was then measured using 1 Kg and 2 Kg weights.

2. 180° Peel Adhesion to Stainless Steel

The Adhesive was cast as a 2 mil. film on a 1.5 mil. PET backing film. Peel Adhesion was measured as the force required to remove a pressure sensitive tape from a standard PSTC stainless steel panel at a specified angle and speed. Required force being expressed in pounds per inch width of tape. Equipment used included a standard PSTC 4½ lb. rubber-covered roller, and a standard Instron Tensile Testing Machine.

The following procedure was followed: a stainless steel panel was cleaned as per standard PSTC method. The coating to be tested was conditioned for 24 hours at 72° F. (±2° F.) and 50% (±5%) Relative Humidity (RH). Test strips having the dimension 1"×6" were cut. The rubber roller was washed with hexane to remove any dirt or oil. About 1" of release liner was removed from the test specimen and applied to the panel and reinforced with 1" wide masking tape. The remainder of release liner was removed from the test specimen and the rubber roller passed over it in each lengthwise direction at a speed of 12" per minute using only the pressure of the weight of the roller (any samples showing the presence of air bubbles were discarded). The test specimen, attached to the panel, was aged for 20 minutes at 72° F. (±2° F.) and 50% (±5%) RH. The Instron was set with a crosshead speed of 12" per minute. The free end of the tape was doubled back at an angle of 180°, clamped to the upper jaw of the Instron and reinforced with masking tape. The end of the panel was clamped to the lower jaw of the Instron. The test strip was then peeled from the panel and the peel force recorded in pounds per inch width of tape.

3. Loop Tack Testing

A 2 mil adhesive film was coated onto a 1.5 mil PET backing film. The film was then coated with release liner, and cut into 1 inch×5 inch strips. A test sample was then inserted into a TMI tester. The tester automatically recorded the tack value in $oz/in^2$.

In the following examples, the commercial components are identified as follows:

SR8296 is a four arm radial multi-block styrene-butadiene copolymer comprising 60% vinyl, 26% styrene and a relatively broad molecular weight distribution (Mn=94,200 and Mw=276,100) and is available from Firestone.

STEREON 857 is a linear multi-block styrene-butadiene copolymer with 57% vinyl, 44% styrene, melt index=13 (cond. G), (Mw=85,000 and Mn=54,000) and is available from Firestone.

KRATON D1118 is a conventional low vinyl styrene-butadiene-styrene copolymer with 30% styrene, melt index=10, is 80% diblock and is available from Shell Chemical Company.

QUINTAC SL117 is a conventional low vinyl styrene-isoprene-styrene block copolymer with 37% styrene, melt index >50, is 65% diblock and is available from Nippon-Zeon.

KX-222C is a four arm radial styrene-butadiene-styrene block copolymer where two arms have styrene ends and two are "free" butadiene arms with 18% styrene, 60% vinyl and is available from Shell Chemical Co. This block copolymer is representative of the prior art as described in U.S. Pat. No. 5,300,582.

ASAPRENE JT 38 is a styrene butadiene block copolymer with 30% styrene-butadiene-styrene and 70% SB diblock, containing 35% styrene, melt index=25 and is available from Asahi Chemical.

756–10 is Kaydol, a naphthenic mineral oil available from Witco.

ECR-179EX is a hydrogenated DCPD (dicyclopentadiene)/C9 tackifier resin having a softening point of about 102° C. and is available from Exxon Chemical Company.

ESCOREZ 5400 is a hydrogenated DCPD resin with a softening point of about 100° C. available from Exxon Chemical Company.

ECR 5380 is a hydrogenated DCPD resin with a softening point of about 80° C. and is available from Exxon Chemical Company.

REGALITE R-10 is a C5 liquid tackifier with a softening point of about 10° C. and is available from Hercules.

IRGACURE 651 is a benzil ketal photoinitiator available from Ciba-Geigy

IRGANOX 3052 is an acrylic/phenolic antioxidant also available from Ciba-Geigy.

SUMILIZER TP-D is a thioester antioxidant available from Sumitomo Chemical Company.

SUMILIZER GM is an acrylic antioxidant available from Sumitomo Chemical Company.

IRGANOX 1010 is 3,5-bis(1,1-Dimethylethyl)-4-hydroxybenzene propanoic acid, 2,2-bis[[3-[3,5-bis(1,1-dimethylethyl)-4-hydroxy phenyl]-1-oxopropoxy]methyl]1,3-propanediyl ester, is a hindered phenol antioxidant and is available from Ciba-Geigy.

SR8219 is a low molecular weight (Mn approx. 40,000) SB tapered diblock, 30% styrene, capped with a hydroxyl group on the styrene end, prepared as described in Adhesive Age, D F Graves and D D Tondra, 11.97 p. 51, by Firestone Synthetic Rubber Co.

Examples 1 to 4, provided for illustrative purposes only, illustrate the radiation-curable compositions of the present invention. Unless otherwise indicated in the following examples, in the specification and in the appended claims, all parts and percentages are by weight, temperatures are in degrees centigrade and pressures are at or near atmospheric pressure. All adhesives were cured using a Fuson H bulb (300 watts/inch) at 18 ft./min.

|  | Example 1 | Example 2 | Example 3 | Example 4 |
| --- | --- | --- | --- | --- |
| SR-8296 | 24 | 24.5 | 24.5 | 23.5 |
| KX-222C | 0 | 0 | 0 | 0 |
| 756-10 | 18 | 18 | 16 | 20 |
| ECR-179EX | 0 | 0 | 26 | 26 |
| ESCOREZ 5400 | 49.5 | 50 | 26 | 26 |
| ECR5380 | 0 | 0 | 0 | 0 |
| SR8219 | 0 | 0 | 6 | 0 |
| ASPARENE JT38 | 0 | 0 | 0 | 3 |
| REGALITE R-10 | 6 | 6 | 0 | 0 |
| IRGACURE 651 | 0.8 | 0.8 | 0.8 | 0.8 |
| IRGANOX 3052 | 0.3 | 0.3 | 0.3 | 0.3 |
| IRGANOX 1010 | 0.2 | 0.2 | 0.3 | 0.3 |
| SUMILZER TP-D | 0.3 | 0.3 | 0.3 | 0.3 |
| 180° peel (lbs/in) | 66 | 5.7 | 5.5 | 5.5 |
| Looptack (oz/sq. in) | 103 | 100 | 71 | 55 |
| Shear (hrs) 4 kg/sq. in 25° C. | >100 | >100 | >100 | >1000 |
| Shear (hrs) 2 kg/sq. in 250° F. | >24 | >24 | >24 | >24 |

Examples 1 to 4 are formulated using a high vinyl radial multi-block styrene-butadiene copolymer according to this invention.

Examples 1 and 2 include 6% of optional liquid tackifier and both formulations show very good 180° Peel and Looptack properties. Example 1 is a preferred formulation according to this invention.

Examples 3 and 4 each contain a different optional high diblock copolymer and show good 180° Peel and Looptack properties.

|  | Comparative Example 5 | Comparative Example 6 | Comparative Example 7 | Comparative Example 8 |
| --- | --- | --- | --- | --- |
| SR-8296 | 0 | 0 | 0 | 0 |
| KX-222C | 23 | 25.5 | 28 | 23.5 |
| 756-10 | 20 | 17.5 | 15 | 18 |
| ECR-179EX | 31 | 28.5 | 28.5 | 27 |
| ESCOREZ 5400 | 26 | 28.5 | 28.5 | 27 |
| ECR5380 | 0 | 0 | 0 | 0 |
| SR8219 | 0 | 0 | 0 | 0 |
| ASPARENE JT38 | 0 | 0 | 0 | 3 |
| REGALITE R-10 | 0 | 0 | 0 | 0 |
| IRGACURE 651 | 0.8 | 0.8 | 0.8 | 0.8 |
| IRGANOX 3052 | 0.3 | 0.3 | 0.3 | 0.3 |
| IRGANOX 1010 | 0 | 0 | 0 | 0 |
| SUMILZER TP-D | 0.3 | 0.3 | 0.3 | 0.3 |
| 180° peel (lbs/in) | 5.1 | 4.9 | 5.5 | 4.5 |
| Looptack (oz/sq. in) | 50 | 27 | 10 |  |
| Shear (hrs) 4 kg/sq. in 25° C. | >1000 | >1000 | >1000 | >1000 |
| Shear (hrs) 2 kg/sq. in 250° F. | >24 | >24 | >24 | >24 |

Comparative Examples 5 to 8 were formulated without the high vinyl. radial multi-block styrene-butadiene copolymer of the current invention, this material was replaced by a block copolymer representative of the prior art.

These formulations show poor combined 180° Peel and Looptack properties when compared to the formulations prepared according to this invention.

We claim:

1. A radiation-curable hot melt pressure sensitive adhesive, comprising:
    (a) from about 5% to about 40% by weight of at least one high vinyl, radial multiblock styrene-butadiene block copolymer which has a relatively broad molecular weight distribution;
    (b) from about 30% to about 80% by weight of at least one solid tackifier;
    (c) from about 0.05% to about 5% by weight of at least one photoinitiator;
    (d) from about 0% to about 15% by weight of at least-one high vinyl, linear styrene-butadiene-styrene or multi-block styrene-butadiene copolymer;
    (e) from about 0% to about 15% by weight of at least one high diblock conventional low vinyl styrene-butadiene-styrene or styrene-isoprene-styrene;
    (f) from about 0% to about 40% by weight of at least one oil or liquid tackifier; and
    (g) from about 0% to about 3% by weight of at least one antioxidant.

2. The radiation-curable hot melt pressure sensitive adhesive of claim 1 having a looptack value greater than 50 oz/sq. in.

3. The radiation-curable hot melt pressure sensitive adhesive of claim 1 having a 1 80.degree peel value greater than 5.5 lb./in when the looptack value is greater than 25 oz/sq. in.

4. The radiation-curable hot melt pressure sensitive adhesive of claim 1 wherein the high vinyl radial multi-block styrene-butadiene block copolymer has a vinyl content of about 20% or greater.

5. The radiation-curable hot melt pressure sensitive adhesive of claim 1 wherein the high vinyl radial multi-block styrene-butadiene block copolymer has a vinyl content of from about 40% to about 70%.

6. The radiation-curable hot melt pressure sensitive adhesive of claim 1 wherein the high diblock conventional low vinyl styrene-butadienestyrene, or styrene-isoprene-styrene, have a diblock content of about 30% or greater.

7. The radiation-curable hot melt pressure sensitive adhesive of claim 1 wherein the high diblock conventional low vinyl styrene-butadiene-styrene, or styrene-isoprene-styrene, have a diblock content of about 50% or greater.

8. A radiation-curable hot melt pressure sensitive adhesive, comprising:
 (a) about 20% to about 30% by weight radial multi-block styrene butadiene block copolymer having about 60% by weight vinyl and about 26% by weight styrene;
 (b) about 45% to about 60% by weight of a hydrogenated tackifier resin;
 (c) about 0.5% to about 1.5% by weight of a photoinitiator;
 (d) about 10% to about 20% by weight of a white mineral oil;
 (e) about 0% to about 0.5% by weight of an acrylic antioxidant;
 (f) about 0% to about 0.5% by weight of a thioester antioxidant;
 (g) about 0% to about 0.5% by weight of a hindered phenol antioxidant; and
 (h) about 0% to about 10% by weight of a diblock copolymer.

9. A substrate having coated thereon the radiation-curable hot melt pressure sensitive adhesive of claim 1 or claim 8.

10. A radiation-curable hot melt pressure sensitive adhesive comprising at least one high vinyl, radial multiblock styrene-butadiene block copolymer; at least one high diblock conventional low vinyl styrene-butadiene-styrene or styrene-isoprene-styrene which has a diblock content of 30% or greater; at least one solid tackifier; and at least one photoinitiator.

11. The adhesive of claims 10 wherein the high diblock conventional low vinyl styrene-butadiene-styrene or styrene-isoprene-styrene has a diblock content of 50% or greater.

12. The adhesive of claim 10 comprising from about 5% to about 40% by weight of the high vinyl, radial multiblock styrene-butadiene block copolymer; up to about 15% of the high diblock conventional low vinyl styrene-butadiene-styrene or styrene-isoprene-styrene; from about 30% to about 80% by weight of the solid tackifier; and from about 0.05% to about 5% by weight of the photoinitiator.

13. The adhesive of claim 12 further comprising from about 0% to about 15% by weight of at least one high vinyl, linear styrene-butadiene-styrene or multi-block styrene-butadiene copolymer; from about 0% to about 40% by weight of at least one oil or liquid tackifier; and from about 0% to about 3% by weight of at least one antioxidant.

* * * * *